(12) United States Patent
Guo et al.

(10) Patent No.: US 11,402,736 B2
(45) Date of Patent: Aug. 2, 2022

(54) LIGHT SOURCE SYSTEM AND PROJECTION DEVICE

(71) Applicant: APPOTRONICS CORPORATION LIMITED, Shenzhen (CN)

(72) Inventors: Zuqiang Guo, Shenzhen (CN); Peng Du, Shenzhen (CN); Yi Li, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 67 days.

(21) Appl. No.: 16/650,898

(22) PCT Filed: Dec. 6, 2017

(86) PCT No.: PCT/CN2017/114753
§ 371 (c)(1),
(2) Date: Aug. 10, 2020

(87) PCT Pub. No.: WO2019/061823
PCT Pub. Date: Apr. 4, 2019

(65) Prior Publication Data
US 2021/0033953 A1 Feb. 4, 2021

(30) Foreign Application Priority Data
Sep. 26, 2017 (CN) .......................... 201710881538.1

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/208* (2013.01); *G03B 21/2013* (2013.01); *G03B 21/2066* (2013.01)

(58) Field of Classification Search
CPC .............. G02B 26/008; G02B 27/141; G02B 27/0994; G03B 21/2013; G03B 21/204;
(Continued)

(56) References Cited

U.S. PATENT DOCUMENTS 8,926,109 B2  1/2015 Lin
9,185,372 B2  11/2015 Takahashi et al.
(Continued)

FOREIGN PATENT DOCUMENTS

CN  102692799 A  9/2012
CN  102906639 A  1/2013
(Continued)

OTHER PUBLICATIONS

Office Action issued in corresponding Chinese Patent Appln. No. 201710881538.1, dated May 9, 2020.
Int'l. Search Report for PCT/CN2017/114753, dated Jun. 19, 2018.

*Primary Examiner* — Magda Cruz
(74) *Attorney, Agent, or Firm* — Blue Filament Law PLLC

(57) ABSTRACT

A light source system includes an excitation light source configured to generate an excitation light; a wavelength conversion device including a conversion region and a non-conversion region, wherein the conversion region is configured to perform a wavelength conversion on the excitation light and first light along a first optical path, the non-conversion region is configured to scatter the excitation light and emit second light along a second optical path, and the conversion region is further configured to emit unconverted excitation light as third light along a third optical path; an adjustment device configured to guide and adjust the first light, the second light and the third light to be emitted in a first divergence angle, a second divergence angle, and a third divergence angle, respectively; and a first
(Continued)

reflective element configured to guide the second light and a portion of the third light to enter the adjustment device.

20 Claims, 6 Drawing Sheets

(58) Field of Classification Search
CPC .............. G03B 21/206; G03B 21/2066; G03B 21/208; G03B 21/005
See application file for complete search history.

(56) References Cited

U.S. PATENT DOCUMENTS

| | | | |
|---|---|---|---|
| 9,274,407 B2 | 3/2016 | Wang et al. | |
| 9,322,530 B2 | 4/2016 | Kimura et al. | |
| 9,594,296 B2 | 3/2017 | Fujita et al. | |
| 9,645,480 B2 | 5/2017 | Liao et al. | |
| 9,904,160 B2* | 2/2018 | Hu | G02B 27/30 |
| 2011/0116253 A1* | 5/2011 | Sugiyama | G03B 33/08 362/84 |
| 2011/0242791 A1 | 10/2011 | Chen et al. | |
| 2013/0057833 A1 | 3/2013 | Katou | |
| 2013/0070205 A1 | 3/2013 | Pan et al. | |
| 2013/0088690 A1 | 4/2013 | Wang et al. | |
| 2013/0322056 A1* | 12/2013 | Konuma | G03B 21/204 362/84 |
| 2014/0132937 A1 | 5/2014 | Daniels | |
| 2014/0211169 A1* | 7/2014 | Kitano | H04N 9/3161 353/31 |
| 2015/0036332 A1 | 2/2015 | Wang et al. | |
| 2015/0362830 A1* | 12/2015 | Liao | G03B 21/2066 353/31 |
| 2016/0073068 A1* | 3/2016 | Miyazaki | G02B 26/008 353/31 |
| 2016/0131967 A1 | 5/2016 | Saitou | |
| 2017/0127026 A1* | 5/2017 | Hsu | G03B 21/204 |
| 2019/0171097 A1* | 6/2019 | Fujii | G03B 33/08 |
| 2019/0317388 A1* | 10/2019 | Chen | G03B 21/208 |
| 2020/0124952 A1* | 4/2020 | Guo | G03B 21/204 |
| 2020/0124955 A1* | 4/2020 | Hu | G03B 21/204 |

FOREIGN PATENT DOCUMENTS

| | | |
|---|---|---|
| CN | 103018864 A | 4/2013 |
| CN | 103453448 A | 12/2013 |
| CN | 103809292 A | 5/2014 |
| CN | 103930825 A | 7/2014 |
| CN | 105182672 A | 12/2015 |
| CN | 105264437 A | 1/2016 |
| CN | 105278226 A | 1/2016 |
| CN | 205176468 U | 4/2016 |
| CN | 106154717 A | 11/2016 |
| EP | 1063852 A | 12/2000 |
| JP | 2001183603 A | 7/2001 |
| JP | 2011113071 A | 6/2011 |
| JP | 2013076968 A | 4/2013 |
| JP | 2014077980 A | 5/2014 |
| JP | 2014142369 A | 8/2014 |
| KR | 20040005157 A | 1/2004 |
| WO | 2012138020 A1 | 10/2012 |

* cited by examiner

LIGHT SOURCE SYSTEM AND PROJECTION DEVICE

TECHNICAL FIELD

The present disclosure relates to the field of optical technology, and particularly, to a light source system and a projection device.

BACKGROUND

At present, spatial light modulators are widely used in the projection display field. The spatial light modulators generally include LCD, LCOS, DMD, etc. A monolithic spatial light modulator projection system implements colorful projection display based on primary color lights that are switched in a time-sequence, and it is widely used in the medium-range and low-end market due to its characteristics of simple structure and low cost. Since the excited light generated by laser-excited phosphor has a relatively wide spectral bandwidth, a filter is usually incorporated in the light source to intercept the required wavelength bands, for example intercepting green or red light from yellow fluorescence.

In practical light sources, the use of the filter to filter the spectrum of phosphor may increase the difficulty of the light source in terms of the following aspects: (1) in terms of structure, a volume of the light source is increased, and it is hard to manufacture a small, compact, and ultra-thin light source; (2) in terms of consistency of the light source, since brightness and color of the light source is very sensitive to a coating tolerance (usually +/−5-8 nm) of the filter used by a filter wheel, the use of the filter wheel may reduce the consistency of the color and brightness of the light source; and (3) in terms of control, when a dual color wheel system including a fluorescent wheel and a filter wheel is used, a synchronous control of the color wheel is necessary, which increases the complexity of the light source.

If the filter wheel is omitted, it will also bring some problems to the light source. (1) The phosphor has a wide emission spectrum bandwidth and a low color purity, and especially under high power density, the phosphor has saturation phenomenon and the spectrum may drift. Without filtering, a color gamut of the light source will be abnormal, and the color purity is usually improved by mixing with other light sources. (2) In the process of exciting the phosphor with excitation light, it is impossible that the phosphor completely absorbs the excitation light, and thus the excitation light that is not absorbed, with the fluorescence, may enter an optomechanical system together due to the lack of filtering by the filter wheel, which in turn causes color abnormality of the primary color of the light source, resulting in a poor color purity and abnormal color gamut of the primary color of the light source. This is the biggest problem faced when the filter wheel is omitted.

SUMMARY

In view of the above, it is necessary to provide a light source system and a projection device, which guarantees the color purity of the primary color and the uniformity of the light source without using the filter wheel.

The present disclosure provides a light source system, comprising an excitation light source configured to generate excitation light; a wavelength conversion device comprising a conversion region and a non-conversion region, wherein the conversion region is configured to perform wavelength conversion on the excitation light and emit first light along a first optical path, the non-conversion region is configured to scatter the excitation light and emit second light along a second optical path, and the conversion region is further configured to emit the unconverted excitation light, as third light along a third optical path; an adjustment device configured to guide the first light, the second light and the third light, and adjust the first light, the second light and the third light to be emitted in a first divergence angle, a second divergence angle, and a third divergence angle, respectively; and a first reflective element configured to guide the second light and a part of the third light to be incident to the adjustment device.

The present disclosure also provides a projection device comprising the above light source system.

In the light source system provided by the present disclosure, the first light, the second light and the third light are emitted at mutually matching first divergence angle, second divergence angle and third divergence angle, thereby achieving preferable uniformity. Because the wavelength conversion device allows the incident excitation light and the emitted second light to be emitted into different optical paths, and the first reflective element can reflect the second light using a smaller area, only a small part of the third light unconverted by the wavelength conversion device is reflected by the first reflective element into a subsequent optical machine, thereby improving the color purity and color gamut of the primary color of the light source. In addition, a proportion of the third light entering the optical machine is smaller than that of the first light entering the optical machine, which is within an allowable range and thus a desired color purity can also be achieved without filtering the third light with a filter element. Therefore, the use of the filter element can be avoided, thereby reducing the volume of the entire light source system.

Figure 1:
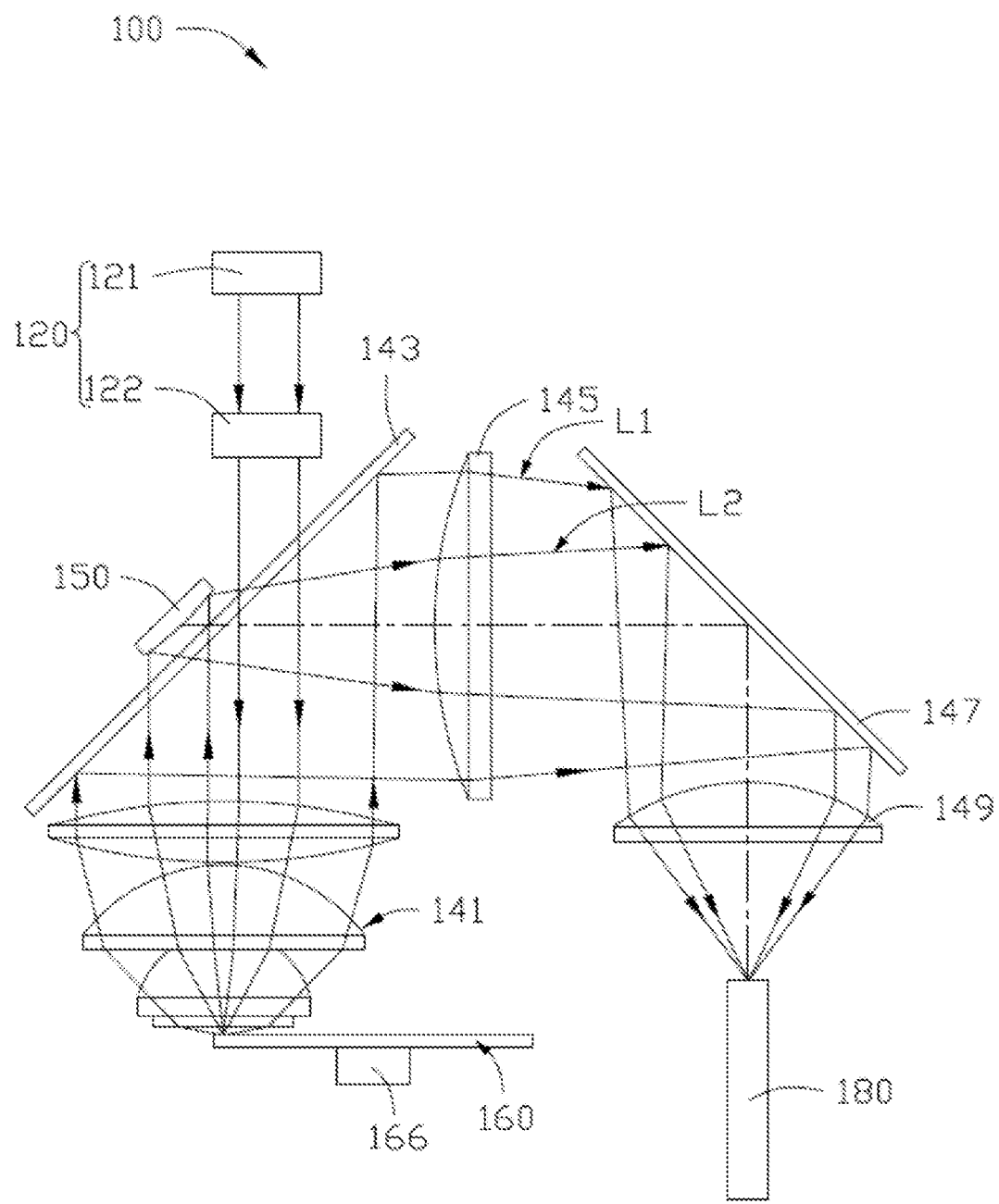
FIG. 1 is a schematic structural diagram of a light source system according to a first embodiment of the present disclosure.

REFERENCE SIGNS OF MAIN ELEMENTS light source system 100, 200, 300
excitation light source 120, 320
illuminant 121
second homogenization optics 122, 322
third converging lens 323
collecting lens group 141, 241, 341
light combining element 143, 343
first converging lens 145
second reflective element 147, 247, 347 flat surface 247a
spherical surface 247b
second converging lens 149, 349
first reflective element 150, 250, 350
wavelength conversion device 160, 260, 360
conversion region 161, 261, 361
red color segment 162
green color segment 163
non-conversion region 164, 264, 364
driving unit 166
notch portion 267
first homogenization optics 180, 280, 380

The present disclosure will be further described in combination with the following specific embodiments with reference to the above drawings.

DESCRIPTION OF EMBODIMENTS

In the following description, many specific details are set forth in order to fully understand the present disclosure, but the present disclosure can also be implemented in other ways than those described herein, and without departing from the meaning of the present disclosure, those skilled in the art can applied them in similar ways. The present disclosure is not limited to the specific embodiments disclosed below.

Please refer to FIG. 1, which is a schematic structural diagram of a light source system 100 according to a first embodiment of the present disclosure. The light source system 100 is applied to a projection device. The light source system 100 includes an excitation light source 120, an adjustment device, a first reflective element 150, a wavelength conversion device 160, and first homogenization optics 180. The excitation light source 120 is configured to generate excitation light of at least one color. The wavelength conversion device 160 is configured to perform wavelength conversion on the excitation light in partial timings of a time-sequence, and emit first light, second light, and third light in a time-sequence. The adjustment device is configured to guide the first light, the second light, and the third light that are incident along an overlapping optical path, and to adjust the first light, the second light, and the third light to be emitted in a first divergence angle, a second divergence, and a third divergence angle, respectively. The first light, the second light, and the third light emitted from the adjustment device have mutually matching angular distributions. The overlapping optical path indicates that a transmission optical path of the first light, a transmission optical path of the second light, and a transmission optical path of the third light at least partially overlap. The first reflective element 150 is configured to guide the second light and a part of the third light to be incident to the adjustment device. The first homogenization optics 180 is configured to homogenize the first light, the second light, and the third light that are emitted in the respective divergence angles.

Specifically, the excitation light source 120 includes a illuminant 121 configured to generate excitation light and a second homogenization optics 122 configured to homogenize the excitation light.

Further, the excitation light source 120 may be a blue light source emitting blue excitation light. It can be understood that the excitation light source 120 is not limited to the blue light source, and the excitation light source 120 may also be a purple light source, a red light source, or a green light source, etc. In the present embodiment, the illuminant 121 is a blue laser configured to emit blue laser light as the excitation light. It can be understood that the illuminant 121 may include one, two or more blue lasers, and the specific number of the lasers may be determined according to actual needs.

The second homogenization optics 122 is located on an optical path of the light emitted by the illuminant 121 and is configured to homogenize the excitation light. In this embodiment, the second homogenization optics 122 is a light homogenizing rod. It can be understood that in other embodiments, the second homogenization optics 122 may include a fly-eye lens, a light homogenizing rod, a diffuser sheet, a scattering wheel, or the like, which are not limited herein.

Figure 2:
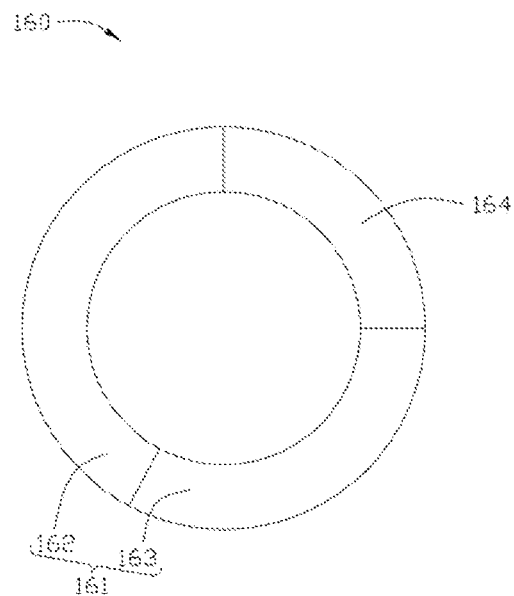
FIG. 2 is a schematic top view of a wavelength conversion device shown in FIG. 1.

Please refer to FIG. 1 and FIG. 2 in combination, wherein FIG. 2 is a schematic top view of the wavelength conversion device 160 shown in FIG. 1. For example, the wavelength conversion device 160 may be circular, square, or the like. A circular wavelength conversion device 160 as an example is shown in FIG. 2, the wavelength conversion device 160 includes a conversion region 161, a non-conversion region 164, and a driving unit 166 provided at the bottom of the wavelength conversion device 160. The conversion region 161 and the non-conversion region 164 are respectively partial regions located in the same circular ring. Alternatively, the conversion region 161 and the non-conversion region 164 are spliced to each other to form a circular ring with a through hole in the center. An upper surface of the conversion region 161 and that of the non-conversion region 164 are located on the same plane, and a lower surface of the conversion region 161 and that of the non-conversion region 164 are located on the same plane. That is, the upper and lower surfaces of the conversion region 161 are flush with those of the non-conversion region 164, respectively. In the present embodiment, the driving unit 166 is a motor, the driving unit 166 drives the wavelength conversion device 160 to perform periodic movement, and the wavelength conversion device 160 rotates around the driving unit 166, as an axis, at a high speed.

The conversion region 161 is configured to perform wavelength conversion on the excitation light and emit first light along a first optical path, and the first light is excited light. The conversion region 161 is further configured to scatter the unconverted excitation light and emit third light along a third optical path, and the third light is the scattered excitation light. The non-conversion region 164 is configured to reflect the excitation light and emit second light along a second optical path, and the second light is the reflected excitation light. The conversion region 161 and the non-conversion region 164 are alternately located on the optical path of the excitation light emitted by the excitation light source 120 under the effect of the driving unit 166. Since the conversion region 161 and the non-conversion region 164 are alternately located on the optical path of the excitation light, the wavelength conversion device 160 emits the first light and the second light in a time-sequence. Since both the first light and the third light are emitted from the conversion region 161 of the wavelength conversion device 160, the third light is emitted substantially simultaneously with the first light.

Specifically, the conversion region 161 is provided with a wavelength conversion material to generate first light of at least one color in a form of Lambertian light under the excitation of the excitation light. As shown in FIG. 2, the conversion region 161 is divided into a red segment 162 and a green segment 163. The red segment 162 is provided with red phosphor to generate first light of red color under the excitation of the excitation light. The green segment 163 is provided with green phosphor to generate first light of green color under the excitation of the excitation light. The excitation light that is not absorbed and converted by the phosphor, for example, the blue excitation light, can be scattered in the red segment 162 and green segment 163 to form third light of blue color, which is reflected in the Lambertian form. It can be understood that, in other embodiments, the conversion region 161 may be further provided with phosphor of color different from red and green, so as to generate the first light of different colors. For example, only yellow phosphor may be provided in the conversion region 161 to generate first light of yellow color. The yellow first light and the blue excitation light are homogenized in the first homogenization optics 180 to form white light.

In this embodiment, the wavelength conversion device 160 is a reflective color wheel, and the non-conversion region 164 is provided with a Gaussian diffuser sheet for diffusing the excitation light, such that the divergence angle of the excitation light is increased. In addition, the Gaussian diffuser sheet can simultaneously achieve the functions of decoherence and light homogenization, thereby alleviating the phenomenon of laser speckles. In this embodiment, the Gaussian diffuser sheet is a reflective Gaussian diffuser sheet for scattering and then reflecting the excitation light.

The adjustment device includes a collecting lens group 141, a light combining element 143, a first converging lens 145, a second reflective element 147, and a second converging lens 149. The first light, the second light, and the third light emitted from the adjustment device at respective divergence angles after sequentially passing through the collecting lens group 141, the light combining element 143, the first converging lens 145, the second reflective element 147, and the second converging lens 149.

The first light, the second light, and the third light should have mutually matching angular distributions at an entrance surface of the first homogenization optics 180, such that the first light, the second light, and the third light can form a uniform light spot at an exit surface of the first homogenization optics 180 after passing through the first homogenization optics 180. For example, an absolute difference between any two divergence angles of the first light, the second light, and the third light that are incident to the entrance surface of the first homogenization optics 180 is not greater than 10 degrees, such that the first light, the second light, and the third light have mutually matching angular distributions at the entrance surface of the first homogenization optics 180. The divergence angles of the first light, the second light, and the third light can be adjusted by adjusting focal lengths (curvatures) of the collecting lens group 141, the first converging lens 145, and the second converging lens 149, by adjusting a distance between the collecting lens group 141 and the wavelength conversion device 160 or the first reflective element 150, by adjusting a position of the second converging lens 149, or the like. In the present embodiment, the curvatures of the collecting lens group 141, the first converging lens 145, and the second converging lens 149 match each other, so that the first divergence angle of the first light is consistent with the second divergence angle of the second light when they are emitted from the second converging lens 149. In this way, the light emitted from the first homogenization optics 180 has better uniformity.

Specifically, the collecting lens group 141 is disposed close to the wavelength conversion device 160, and the collecting lens group 141 includes a plurality of laminated lenses having a same optical axis and different focal lengths. The optical axis is perpendicular to the surface of the wavelength conversion device 160. The focal length of each of the plurality of lenses of the collecting lens group 141 decreases as it approaches the wavelength conversion device 160.

A main optical axis of the collecting lens group 141 is parallel to, but does not overlap a main optical axis of the excitation light source 120, so that the optical path of the excitation light incident to the wavelength conversion device 160 does not overlap that of the second light emitted from the wavelength conversion device 160. The excitation light emitted by the excitation light source 120 is incident to the collecting lens group 141 in parallel with while being deviated from the optical axis of the collecting lens group 141. After being converged by the collecting lens group 141, the excitation light emitted to the wavelength conversion device 160 at a preset tilt angle forms a small light spot.

When the conversion region 161 is located on the optical path of the excitation light, the first light in the Lambertian form emitted from the wavelength conversion device 160 is collimated by the collecting lens group 141 and then is emitted to the light combining element 143. The optical path along which the excitation light is incident to the wavelength conversion device 160 overlaps the optical path along which the first light emitted from the wavelength conversion device 160. In addition, the excitation light that is not absorbed by the conversion region 161 is emitted from the wavelength conversion device 160 to form the third light in the Lambertian form, and the third light is collimated by the collecting lens group 141 and then is emitted to the light combining element 143. The optical path along which the excitation light incident to the wavelength conversion device 160 partially overlaps the optical path along which the third light emitted from the wavelength conversion device 160.

When the non-conversion region 164 is located on the optical path of the excitation light, the excitation light will be scattered and then reflected by the reflective Gaussian diffuser sheet. According to the law of reflection, the second light, which is emitted from the wavelength conversion device 160 at the preset tilt angle along the second optical path and distributed in a Gaussian form, is collimated by the collecting lens group 141 and then is emitted to the light combining element 143, and the optical path along which the excitation light incident to the wavelength conversion device 160 and the optical path along which the second light emitted from the wavelength conversion device 160 are symmetrically distributed with respect to the optical axis of the collecting lens group 141 and do not overlap.

The light combining element 143 may adopt a wavelength-splitting optical structure, i.e., it combines light according to different wavelength ranges of incident light. As an example of wavelength splitting, the light combining element 143 is configured to transmit the excitation light, the second light and the third light, and reflect the first light. The excitation light, the second light, and the third light are in the same wavelength range. Specifically, the light combining element 143 includes a first surface and a second surface that are arranged opposite to each other, and the excitation light emitted by the excitation light source 120 is incident to the first surface of the light combining element 143 and is emitted to the collecting lens group 141 through the second surface thereof.

The second reflective element 147 is configured to reflect the first light, the second light and the third light that are emitted from the first converging lens 145 to the second converging lens 149. In the present embodiment, the second reflective element 147 is a planar reflection mirror.

The first light, after being reflected by the light combining element 143, is sequentially subjected to, along the optical path L1, a convergence through the first converging lens 145, a reflection through the second reflective element 147, a convergence through the second converging lens 149, and then is emitted to the first homogenization optics 180 at the first divergence angle.

The first reflective element 150 may be a reflective convex lens, a reflective diffuser sheet, or a single fly-eye. Specifically, the first reflective element 150 is disposed close to the first surface of the light combining element 143, and the first reflective element 150 is located on the optical axis of the first converging lens 145. The first reflective element 150 is configured to reflect the second light and the third light.

The second light, after being reflected by the first reflective element 150, is sequentially subjected to, along the optical path L2, the convergence through the first converging lens 145, the reflection through the second reflective element 147, and the convergence through the second converging lens 149, and then is emitted to the first homogenization optics 180 at the second divergence angle. The first light and the second light that are emitted to the entrance surface of the first homogenization optics 180 have mutually matching angular distributions, such that the first homogenization optics 180 has nearly consistent responses to the first light and the second light. Therefore, the first light and the second light can be more uniformly mixed, thereby improving uniformity of the light source.

In this embodiment, the first light and the second light are both focused at the entrance surface of the first homogenization optics 180, and both of the two can completely fill a cross section of the first homogenization optics 180, such that the first light and the second light can be reflected as many times as possible inside the first homogenization optics 180, thereby improving the light homogenization effect. The second divergence angle of the second light is smaller than the first divergence angle of the first light. The spots of the first light and the second light incident to the first homogenization optics 180 completely fall within the entrance surface of the first homogenization optics 180 and can be reflected multiple times inside the first homogenization optics 180, which not only reduces the loss of incident light but also improves the light extraction efficiency of the light source system 100 while achieving a better light homogenization effect.

Figure 3:
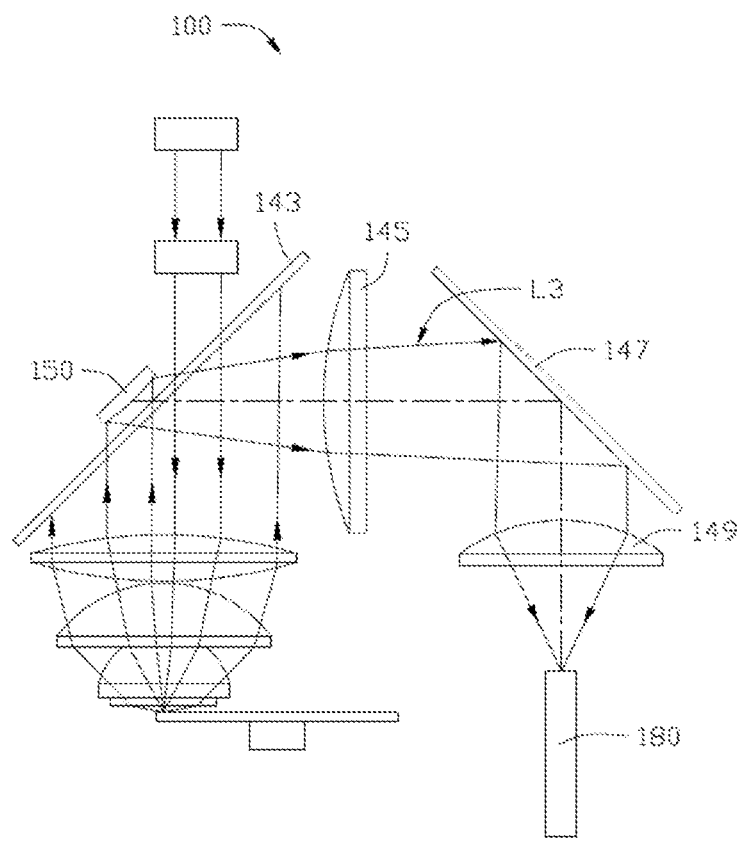
FIG. 3 is a schematic diagram of an optical path of third light in the first embodiment of the present disclosure.

Please refer to FIG. 3, which is a schematic diagram of an optical path of the third light in the first embodiment of the present disclosure. The third light is transmitted through the light combining element 143 and then is incident to the first reflective element 150. The third light, after being reflected by the first reflective element 150, is sequentially subjected to, along the optical path L3, the convergence through the first converging lens 145, the reflection through the second reflective element 147, and the convergence of the second converging lens 149, and then is emitted to the first homogenization optics 180 at the third divergence angle. In the present embodiment, the optical path L3 coincides with the optical path L2, the third divergence angle is equal to the second divergence angle, and the second light and the third light are emitted from the second converging lens 149 along the same optical path. Since the third light is distributed in the Lambertian form and the reflection surface of the first reflective element 150 is relatively small, only a small part of the third light at the light combining element 143 is transmitted through the light combining element 143, reflected by the first reflective element 150, and then enters the first homogenization optics 180. That is, it has negligible influence on the color purity and color gamut of the primary color of the light source.

Without a filter element for light filtering, the light source system 100 provided in the first embodiment of the present disclosure uses the adjustment device and the first reflective element 150, which cooperate to guide the first light, the second light, and the third light. Thus, a volume of the light source system 100 is effectively reduced, which is beneficial to the miniaturization design of the light source system 100 and the projection device. In addition, only a small part of the excitation light that is not absorbed by the wavelength conversion device 160 (the third light) is reflected by the first reflective element 150 and then is emitted to the first homogenization optics 180, which has little and even negligible influence on the color purity and the color gamut for the primary color of the light source. Therefore, the color purity of the primary color of the light source can be guaranteed.

Figure 4:
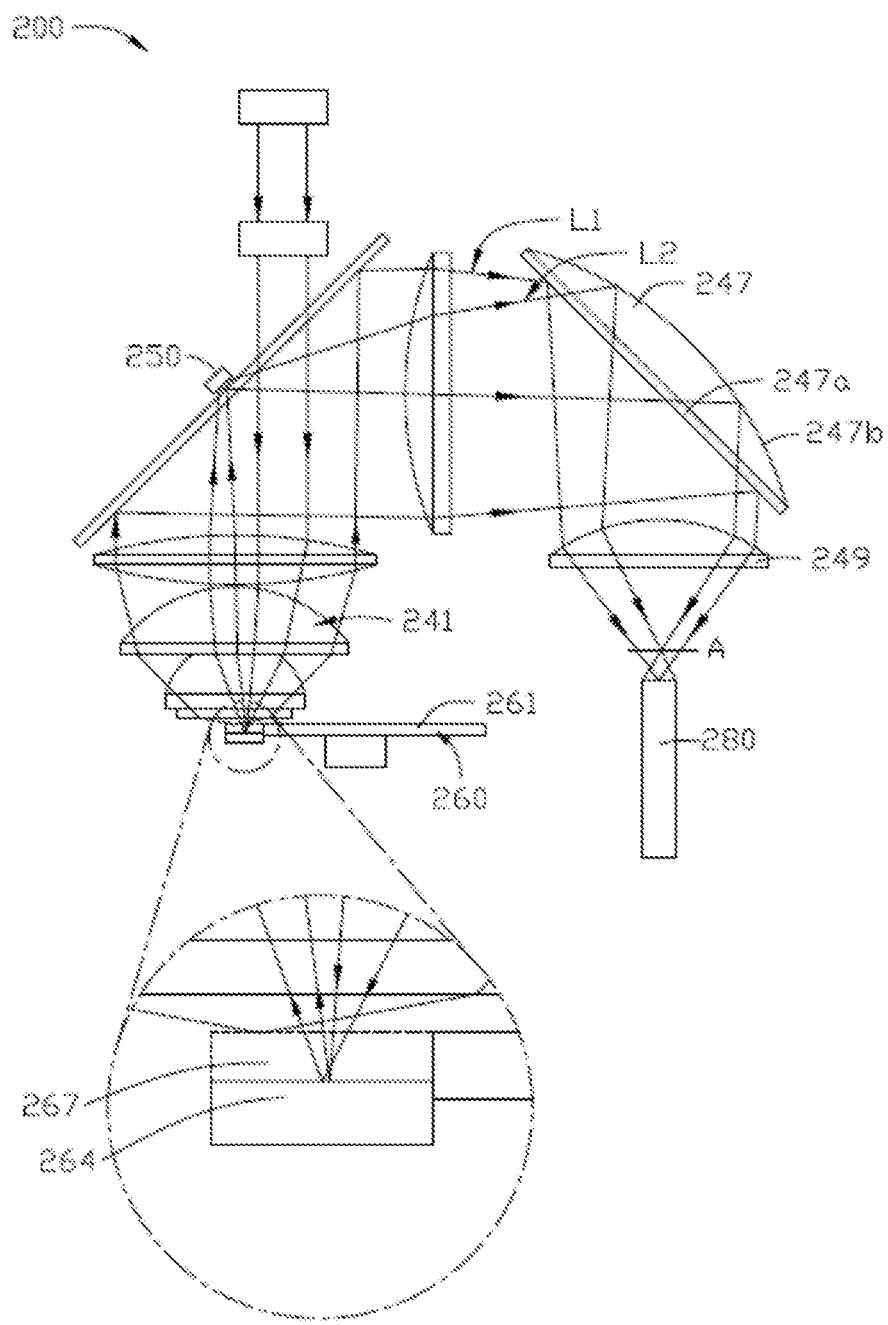
FIG. 4 is a schematic structural diagram of a light source system according to a second embodiment of the present disclosure.

Please refer to FIG. 4, which is a schematic structural diagram of a light source system 200 according to a second embodiment of the present disclosure. The light source system 200 of the second embodiment differs from the light source system 100 of the first embodiment in that the wavelength conversion device 260 and the second reflective element 247 have structures different from those of the first embodiment, and the first reflective element 250 is located at an aperture stop of the second light.

The second reflective element 247 is a reflective convex lens. An outer surface of the second reflective element 247 is configured to transmit the second light and the third light, and reflect the first light. An inner surface of the second reflective element 247 is provided with a reflective film configured to converge and reflect the second light and the third light. In this embodiment, the excitation light is blue light, and the first light includes red first light and green first light. The convex lens is a planoconvex lens, and a dichroic film transmitting blue light and reflecting yellow light is arranged at an external side of the flat surface 247a of the planoconvex lens. A specular reflection material or a dichroic film reflecting blue light and transmitting yellow light is provided on an inner side of a spherical surface 247b of the planoconvex lens. It can be understood that, in other embodiments, a dichroic film having other central wavelengths may be provided on the convex lens according to the actual needs.

The non-conversion region 264 of the wavelength conversion device 260 is lower than the conversion region 261 of the wavelength conversion device 260 by a preset distance. In this way, the excitation light, which passes through the collecting lens group 241 and is incident to the non-conversion region 264, has a light spot out of focus. Specifically, a notch portion 267 is formed on the wavelength conversion device 260, and the notch portion 267 together with the conversion region 261 define a circular ring with a through hole in the center. The non-conversion region 264 is disposed inside the notch portion 267, and an upper surface of the non-conversion region 264 is lower than that of the conversion region 261 by the preset distance. In this embodiment, a lower surface of the non-conversion region 264 is lower than that of the conversion region 261. Since the upper surface of the non-conversion region 264 is lower than that of the conversion region 261 by the preset distance, a light spot (on an object surface) of the excitation light incident to the non-conversion region 264 is further away from the collecting lens group 241, and under the effect of the collecting lens group 241, the excitation light reflected by the non-conversion region 264 is converged on the first reflective element 250 (at the aperture stop of the second light) with a smaller angle. In this embodiment, the first reflective element 250 is located at a position where the second light is focused, so that the light spot of the excitation light, which is out of focus, is converged on the first reflective element 250 with the minimum angle. Thus, the light spot of the second light incident to the first reflective element 250 is minimized, and the area of the first reflective element 250 can be reduced.

It can be understood that, in other embodiments, the upper surface of the non-conversion region 264 may be flush with the lower surface of the conversion region 261, or the lower surface of the non-conversion region 264 may be flush with the lower surface of the conversion region 261. It can be understood that, in other embodiments, the wavelength conversion device 260 may further include a transmission portion and a reflective unit, the transmission portion is accommodated in the notch portion, the reflective unit is disposed on the lower surface of the transmission portion, and the transmission portion and the reflective unit together constitute the non-conversion region.

In this embodiment, the second light and the first light are emitted to the first homogenization optics 280 with the same divergence angle, and emitted from the second converging lens 249 along the same optical path. The first light is focused at the entrance surface of the first homogenization optics 280, and it can completely fill a cross section of the first homogenization optics 280. Since the light spot of the excitation light is out of focus, the optical path of the second light is longer than that of the first light. Therefore, the second light is focused at a position A in front of the entrance surface of the first homogenization optics 280, the area of the light spot (in a defocused state) formed by the diffused second light at the entrance surface of the first homogenization optics 280 equal to an area of the entrance surface, so that the second light at the entrance surface can completely fill a cross section of the first homogenization optics 280.

Figure 5:
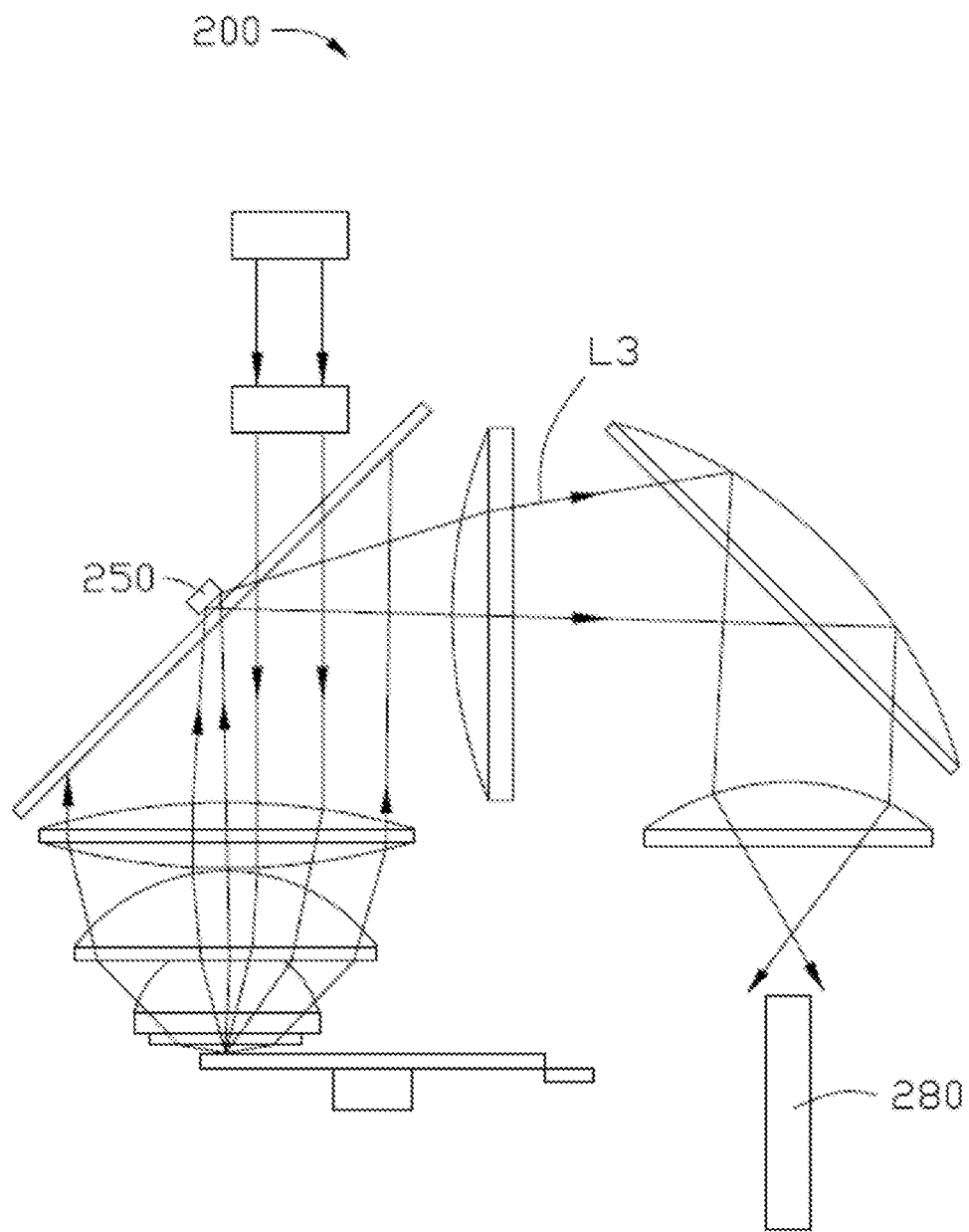
FIG. 5 is a schematic diagram of an optical path of third light in the second embodiment of the present disclosure.

Please refer to FIG. 5 in combination, which is a schematic diagram of an optical path of the third light in the second embodiment of the present disclosure. The third light, after being reflected by the first reflective element 250, is emitted to the first homogenization optics 280 at a third divergence angle along the optical path L3. And the third light is focused in front of the entrance surface of the first homogenization optics 280. Since the upper surface of the non-conversion region 264 is lower than that of the conversion region 261, the optical path of the third light, which is emitted from the conversion region 261 to the first reflective element 250, is shorter than the optical path of the second light, which is emitted from the conversion region 264 and focused on the first reflective element 250. In this way, the third light cannot be focused on the first reflective element 250. Therefore, the third divergence angle of the unfocused third light emitted from the first reflective element 250 is greater than the second divergence angle of the focused second light. Therefore, an area of a light spot formed by the third light at the entrance surface of the first homogenization optics 280 is larger than that formed by the second light at the entrance face of the first homogenization optics 280, That is, the area of the light spot formed by the third light at the entrance surface of the first homogenization optics 280 is larger than the area of the entrance surface of the first homogenization optics 280. Therefore, only a small part of the third light reflected by the first reflective element 250 enters the first homogenization optics 280, and the rest part of the third light is emitted to the outside of the first homogenization optics 280 without entering the first homogenization optics 280.

Compared with the first embodiment, in this embodiment, the structure of the wavelength conversion device 260 is designed in such manner that the excitation light passing through the collecting lens group 241 and incident to the non-conversion region 264 has the light spot out of focus, and the first reflective element 250 is located at the aperture stop. Thus, the excitation light emitted from the non-conversion region 264 (i.e., second light) can be converged at the first reflective element 250 with a smaller angle, thereby reducing a size of the first reflective element 250. Since the size of the first reflective element 250 is reduced, compared with the first embodiment, only a smaller part of the excitation light (third light) can be reflected by the first reflective element 250 and then incident to the first homogenization optics 280. In addition, since the area of the light spot formed by the third light at the entrance surface of the first homogenization optics 280 is larger than the area of the entrance surface of the first homogenization optics 280, only a part of the third light reflected by the first reflective element 250 can enter the first homogenization optics 280. Therefore, in the light source system 200 provided in the second embodiment of the present disclosure, a smaller part of third light enters the first homogenization optics 280, which further improves the color purity and color gamut of the primary color of the light source.

Figure 6:
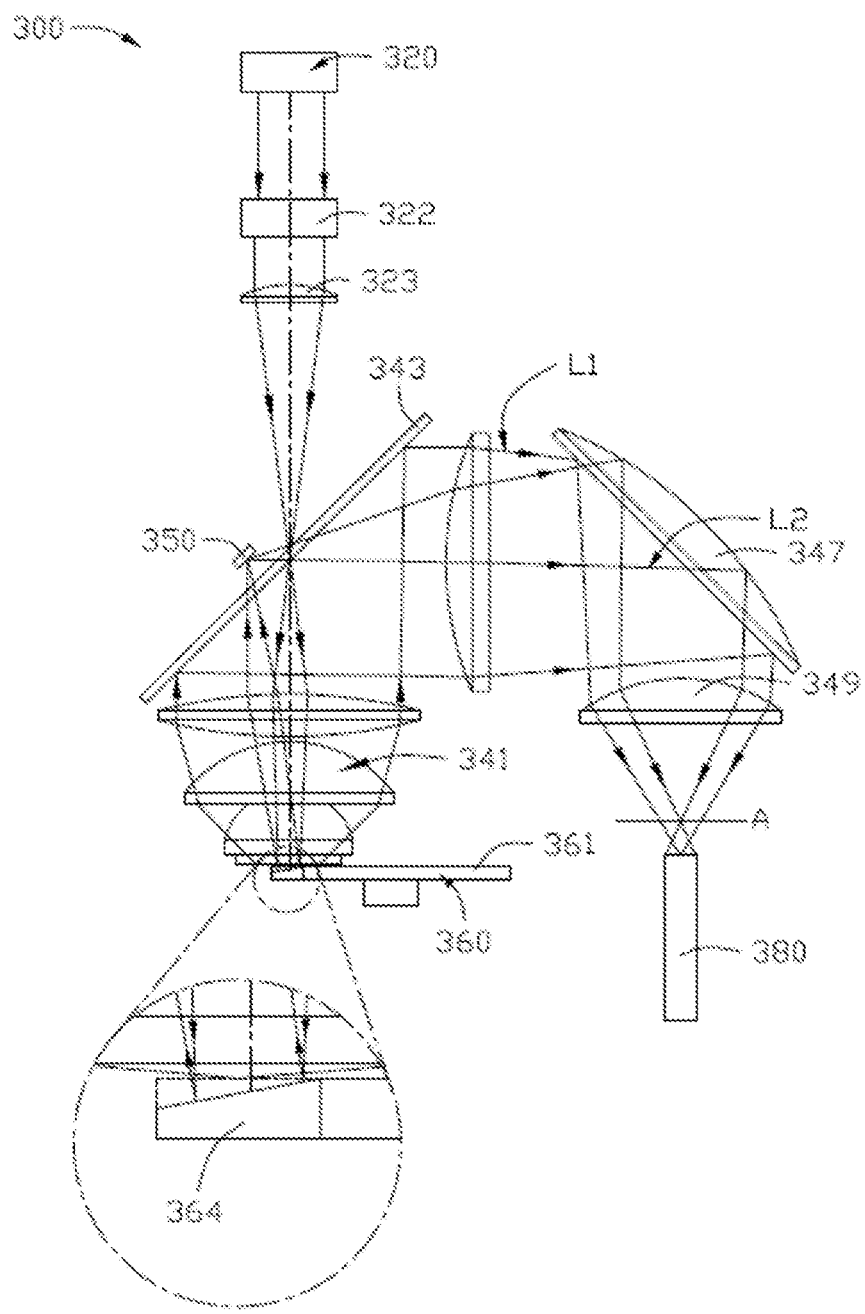
FIG. 6 is a schematic structural diagram of a light source system according to a third embodiment of the present disclosure.

Please refer to FIG. 6, which is a schematic structural diagram of a light source system 300 according to a third embodiment of the present disclosure. The light source system 300 of the third embodiment differs from the light source system 100 of the first embodiment in the structures of the wavelength conversion device 360 and the second reflective element 347. The excitation light source 320 further includes a third converging lens 323, the collecting lens group 341 and the excitation light source 320 are coaxially disposed, the light combining element 343 is located at the focus of the third converging lens 323, and the first reflective element 350 is located at the aperture stop of the second light.

The third reflective element 347 has the same structure as the second reflective element 247 of the second embodiment, which is not described in detail again.

The third converging lens 323 is located on an optical path of light emitted by the excitation light source 320 and is configured to converge the excitation light emitted by the excitation light source 320 to the light combining element 343, wherein the light combining element 343 is the aperture stop of the excitation light emitted by the excitation light source 320. The excitation light is converged at the light combining element 343 and then diverged. The diverged excitation light is converged again through the collecting lens group 341 to form an excitation light spot on the surface of the wavelength conversion device 360.

The upper surface of the non-conversion region 364 (an incident surface of the excitation light) is inclined with respect to the upper surface of the conversion region 361 in such a manner that an incident optical path of the excitation light incident to the non-conversion region 364 does not coincide with a reflective optical path. In this way, the incident light beam is separated from the reflected light beam. In this embodiment, the upper surface of the non-conversion region 364 is inclined downward from its inner sidewall side toward its outer sidewall side, and the upper surface of the non-conversion region 364 is adjacent. It can be understood that, in other embodiments, the upper surface of the non-transformation region 364 is inclined upward from the inner sidewall side toward the outer sidewall side.

The excitation light (second light) reflected at a tilt angle is collimated by the collecting lens group 341 and is transmitted by the light combining element 343, sequentially, and then is converged on the first reflective element 350. The optical path of the excitation light emitted from the light combining element 343 to the non-conversion region 364 is the same as that of the excitation light emitted from the non-conversion region 364 to the first reflective element 350. Therefore, the first reflective element 350 is an aperture stop position of the second light. Therefore, an excitation light spot formed by the second light focused at the first reflective element 350 is very small, which can in turn reduce the area of the first reflective element 350.

In this embodiment, the second light and the first light are emitted to the first homogenization optics 380 at the same divergence angle, and emitted from the second converging lens 349 along the same optical path. The first light is focused on the entrance surface of the first homogenization optics 380, and it can completely fill the cross section of the first homogenization optics 380. Since the upper surface of the non-conversion region 364 is inclined, the optical path of the second light is longer than that of the first light. Therefore, the second light is focused at the position A in the front of the entrance surface of the first homogenization optics 380, and the area of the light spot (in the defocused state) formed by the diffused second light at the entrance surface of the first homogenization optics 380 is equal to the area of the entrance surface, so that the second light at the entrance surface can completely fill the cross section of the first homogenization optics 380.

Figure 7:
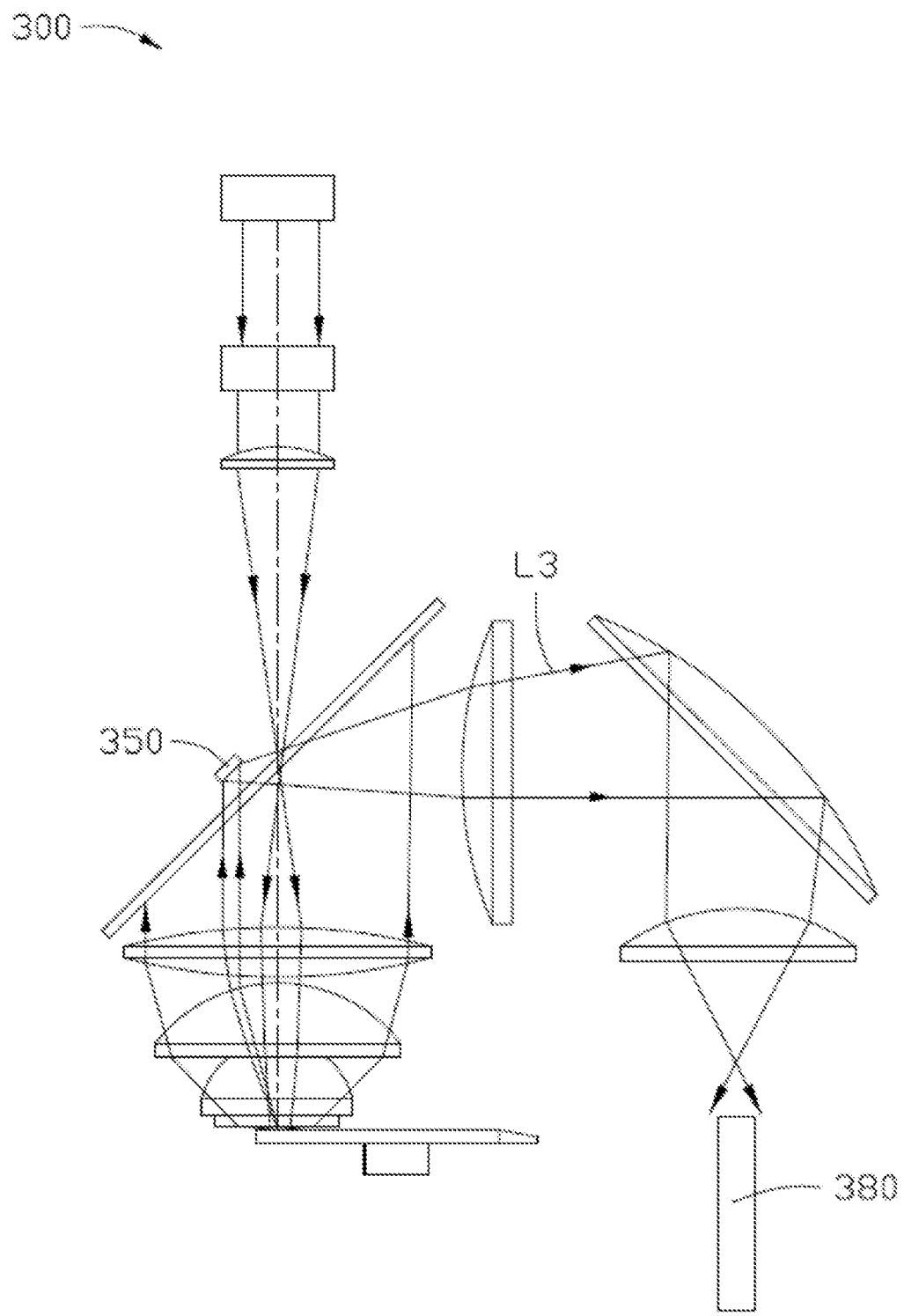
FIG. 7 is a schematic diagram of an optical path of third light in the third embodiment of the present disclosure.

Please refer to FIG. 7, which is a schematic diagram of an optical path of the third light in the third embodiment of the present disclosure. The third light, after being reflected by the first reflective element 350, is emitted to the first homogenization optics 380 at the third divergence angle along the optical path L3. The third light is focused in front of the entrance of the first homogenization optics 380. Since the upper surface of the non-conversion region 364 is inclined, the optical path of the third light which is emitted from the conversion region 361 to the first reflective element 350 is shorter than the optical path of the second light which is emitted from the non-conversion region 364 and focused on the first reflective element 350, so that the third light cannot be focused at the first reflective element 350. Therefore, the third divergence angle of the unfocused third light emitted from the first reflective element 350 is greater than the second divergence angle of the focused second light. Therefore, the area of the light spot formed by the third light at the entrance surface of the first homogenization optics 380 is larger than the area of the light spot formed by the second light at the entrance surface of the first homogenization optics 380. That is, the area of the light spot formed by the third light at the entrance surface of the first homogenization optics 380 is larger than the area of the entrance surface of the first homogenization optics 280. Therefore, only a small part of the third light that is reflected by the first reflective element 350 will enter the first homogenization optics 380, and the rest of the third light will be emitted to the outside of the first homogenization optics 380 and will not enter the first homogenization optics 380.

It should be noted that, in this embodiment, the collecting lens group 341 and the second reflective element 347 constitute a telescope system, and thus the third light, after passing through the collecting lens group 341, is converged at a position of the first reflective element 350 where the focuses of the collecting lens group 341 and the second reflective element 347 are located.

Compared with the first embodiment, the optical axis of the excitation light source 320 in this embodiment is coaxial with the collecting lens group 341, which reduces the difficulty of optical design; and the first reflective element 350 is located at the aperture stop, so that the size of the first reflective element 350 can be reduced, thereby reducing the third light reflected by the first reflective element 350. Therefore, only a smaller part of the third light can be reflected by the first reflective element 350 and then incident to the first homogenization optics 380. In addition, since the area of the light spot formed by the third light at the entrance surface of the first homogenization optics 380 is larger than the area of the entrance surface of the first homogenization optics 380, only a part of the third light which has been reflected by the first reflective element 250 can enter the first homogenization optics 380, thereby further improving the color purity and color gamut of the primary color of the light source.

It can be understood that, it is possible in other embodiments that, only the wavelength conversion device 260 in the second embodiment can be used to replace the wavelength conversion device 160 in the first embodiment, or only the second reflective element 247 in the second embodiment can be used to replace the second reflective element 147 in the first embodiment, or the wavelength conversion device 360 in the third embodiment is used to replace the wavelength conversion device 260 in the second embodiment, and so on. In other words, under the premise of no conflicts, those skilled in the art can interchange and combine these features in the embodiments to obtain new embodiments.

The above embodiments are merely used to illustrate, but not to limit the technical solutions of the present disclosure. Although the present disclosure is described in detail with reference to the above preferred embodiments, those skilled in the art should understand that the technical solutions of the present disclosure may be modified or equivalently replaced without departing from the spirit and scope of the technical solutions of the present disclosure.

What is claimed is:

1. A light source system, comprising:
an excitation light source configured to generate excitation light;
a wavelength conversion device comprising a conversion region and a non-conversion region, wherein the conversion region is configured to perform wavelength conversion on the excitation light and emit first light along a first optical path, the non-conversion region is configured to scatter the excitation light and emit second light along a second optical path, and the conversion region is further configured to emit unconverted excitation light as third light along a third optical path;
an adjustment device configured to guide and adjust the first light, the second light and the third light so as to emit the first light, the second light and the third light in a first divergence angle, a second divergence angle, and a third divergence angle, respectively; and
a first reflective element configured to guide the second light and a part of the third light to be incident to the adjustment device,
wherein the adjustment device comprises a collecting lens group, a first converging lens, and a second converging lens curvatures of which are mutually matched, and wherein the first light, the second light and the third light are emitted from the second converging lens in the respective divergence angles after sequentially passing through the collecting lens group, the first converging lens, and the second converging lens.

2. The light source system according to claim 1, wherein the adjustment device further comprises a light combining element configured to transmit the second light and the third light and reflect the first light and a second reflective element configured to reflect the first light, the second light and the third light, which are emitted from the first converging lens, to the second converging lens.

3. The light source system according to claim 2, wherein the collecting lens group is arranged close to the wavelength conversion device, and the collecting lens group comprises a number of lenses having a same optical axis, wherein the excitation light emitted by the excitation light source passes through the light combing element and is incident to the collecting lens group in parallel to and deviated from the optical axis, and then irradiates the wavelength conversion device in a preset tilt angle after being converged by the collecting lens group, and wherein an optical path along which the excitation light is incident to the wavelength conversion device does not overlap with an optical path along which the second light is emitted from the wavelength conversion device.

4. The light source system according to claim 2, wherein the first reflective element is a reflective convex lens, a reflective diffuser sheet, or a single fly-eye, and the second reflective element is a planar reflection mirror or a reflective convex lens.

5. The light source system according to claim 2, wherein the collecting lens group is coaxial with the excitation light source, the excitation light source comprises a illuminant and a third converging lens, wherein the illuminant is configured to generate the excitation light, the third converging lens is configured to converge the excitation light emitted by the illuminant to the light combining element, and the light combining element is located at a focus of the third converging lens.

6. The light source system according to claim 1, wherein an upper surface of the non-conversion region is flush with an upper surface of the conversion region, and the third divergence angle is equal to the second divergence angle.

7. The light source system according to claim 1, wherein the light source system further comprises a first homogenization optics, and wherein the first light, the second light and the third light emitted in the respective divergence angles are homogenized by the first homogenization optics and then emitted.

8. The light source system according to claim 7, wherein each of the first light, the second light, and the third light is focused at an entrance surface of the first homogenization optics and completely fills the first homogenization optics.

9. The light source system according to claim 7, wherein the first light is focused at an entrance surface of the first homogenization optics and completely fills the first homogenization optics, the second light and the third light are focused at a position in front of the entrance surface of the first homogenization optics, an area of a light spot formed by the second light at the entrance surface of the first homogenization optics is equal to an area of the entrance surface, and an area of a light spot formed by the third light at the entrance surface of the first homogenization optics is larger than the area of the entrance surface.

10. A projection device comprising a light source system, which comprises:
an excitation light source configured to generate excitation light;
a wavelength conversion device comprising a conversion region and a non-conversion region, wherein the conversion region is configured to perform wavelength conversion on the excitation light and emit first light along a first optical path, the non-conversion region is configured to scatter the excitation light and emit second light along a second optical path, and the conversion region is further configured to emit unconverted excitation light as third light along a third optical path;
an adjustment device configured to guide and adjust the first light, the second light and the third light so as to emit the first light, the second light and the third light in a first divergence angle, a second divergence angle, and a third divergence angle, respectively; and
a first reflective element configured to guide the second light and a part of the third light to be incident to the adjustment device,
wherein the adjustment device comprises a collecting lens group, a first converging lens, and a second converging lens curvatures of which are mutually matched, and wherein the first light, the second light and the third light are emitted from the second converging lens in the respective divergence angles after sequentially passing through the collecting lens group, the first converging lens, and the second converging lens.

11. The projection device according to claim 10, wherein the adjustment device further comprises a light combining element configured to transmit the second light and the third light and reflect the first light and a second reflective element configured to reflect the first light, the second light and the third light, which are emitted from the first converging lens, to the second converging lens.

12. The projection device according to claim 11, wherein the collecting lens group is arranged close to the wavelength conversion device, and the collecting lens group comprises a number of lenses having a same optical axis, wherein the excitation light emitted by the excitation light source passes through the light combing element and is incident to the collecting lens group in parallel to and deviated from the optical axis, and then irradiates the wavelength conversion device in a preset tilt angle after being converged by the collecting lens group, and wherein an optical path along which the excitation light is incident to the wavelength conversion device does not overlap with an optical path along which the second light is emitted from the wavelength conversion device.

13. The projection device according to claim 10, wherein an upper surface of the non-conversion region is flush with an upper surface of the conversion region, and the third divergence angle is equal to the second divergence angle.

14. The projection device according to claim 10, wherein an upper surface of the non-conversion region is lower than that of the conversion region by a preset distance, and the first reflective element is located at an aperture stop of the second light emitted from the non-conversion region.

15. The projection device according to claim 10, wherein an upper surface of the non-conversion region is inclined with respect to an upper surface of the conversion region, and the first reflective element is located at an aperture stop of the second light emitted from the non-conversion region.

16. A light source system, comprising:
an excitation light source configured to generate excitation light;
a wavelength conversion device comprising a conversion region and a non-conversion region, wherein the conversion region is configured to perform wavelength conversion on the excitation light and emit first light along a first optical path, the non-conversion region is configured to scatter the excitation light and emit second light along a second optical path, and the conversion region is further configured to emit unconverted excitation light as third light along a third optical path;
an adjustment device configured to guide and adjust the first light, the second light and the third light so as to emit the first light, the second light and the third light in a first divergence angle, a second divergence angle, and a third divergence angle, respectively; and
a first reflective element configured to guide the second light and a part of the third light to be incident to the adjustment device, wherein the first reflective element is located at an aperture stop of the second light emitted from the non-conversion region.

17. The light source system according to claim 16, wherein an upper surface of the non-conversion region is lower than that of the conversion region by a preset distance.

18. The light source system according to claim 17, wherein a notch portion is formed on the wavelength conversion device, and the non-conversion region is disposed in the notch portion.

19. The light source system according to claim 16, wherein an upper surface of the non-conversion region is inclined with respect to an upper surface of the conversion region.

20. The light source system according to claim 16, wherein the light source system further comprises a first homogenization optics, and wherein the first light, the second light and the third light emitted in the respective divergence angles are homogenized by the first homogenization optics and then emitted.

* * * * *